(12) United States Patent
Farag

(10) Patent No.: US 7,078,981 B2
(45) Date of Patent: Jul. 18, 2006

(54) 16 QAM MODULATOR AND METHOD OF 16 QAM MODULATION

(75) Inventor: Emad N. Farag, Flanders, NJ (US)

(73) Assignee: Lucent Technologies Inc., Murray Hill, NJ (US)

( * ) Notice: Subject to any disclaimer, the term of this patent is extended or adjusted under 35 U.S.C. 154(b) by 3 days.

(21) Appl. No.: 10/899,184

(22) Filed: Jul. 27, 2004

(65) Prior Publication Data

US 2006/0022765 A1    Feb. 2, 2006

(51) Int. Cl.
*H03C 3/00* (2006.01)
*H04L 27/36* (2006.01)

(52) U.S. Cl. ...................... 332/103; 375/298

(58) Field of Classification Search ........ 332/103–105; 375/298, 308
See application file for complete search history.

(56) References Cited

U.S. PATENT DOCUMENTS 4,571,549 A * 2/1986 Lods et al. ................. 332/103
5,237,292 A * 8/1993 Chethik ...................... 332/103
2003/0118123 A1* 6/2003 Hudson et al. ............. 375/295

OTHER PUBLICATIONS

Morais, D. H. et al; "NLA-QAM: A Method for Generating High-Power QAM Signals Through Nonlinear Amplification"; IEEE Transactions on Communications, vol. COM-30, No. 3; Mar. 1982; pp. 517-522.*

* cited by examiner

*Primary Examiner*—David Mis

(57) ABSTRACT

In one embodiment, the 16-quadrature amplitude modulation QAM modulator includes a logic operation device performing a logic operation on first-fourth bits of received data to generate first and second logic outputs. A first quadrature phase shift keying QPSK modulator receives the first and second bits of received data and generates a first QPSK signal. A second QPSK modulator receives the first and second logic outputs and generates a second QPSK signal. A combiner combines the first and second QPSK signals to generate a 16-QAM signal.

23 Claims, 3 Drawing Sheets

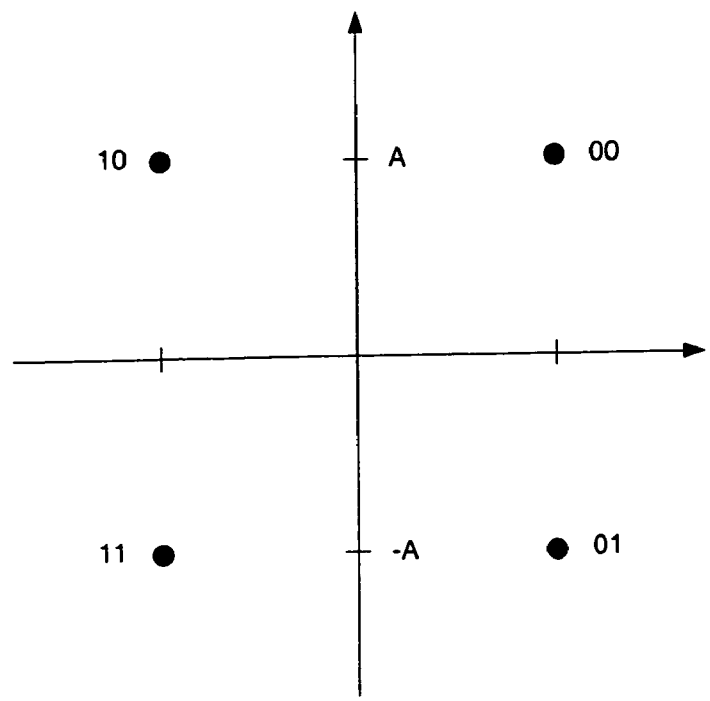
FIG. 2
Fig. 3
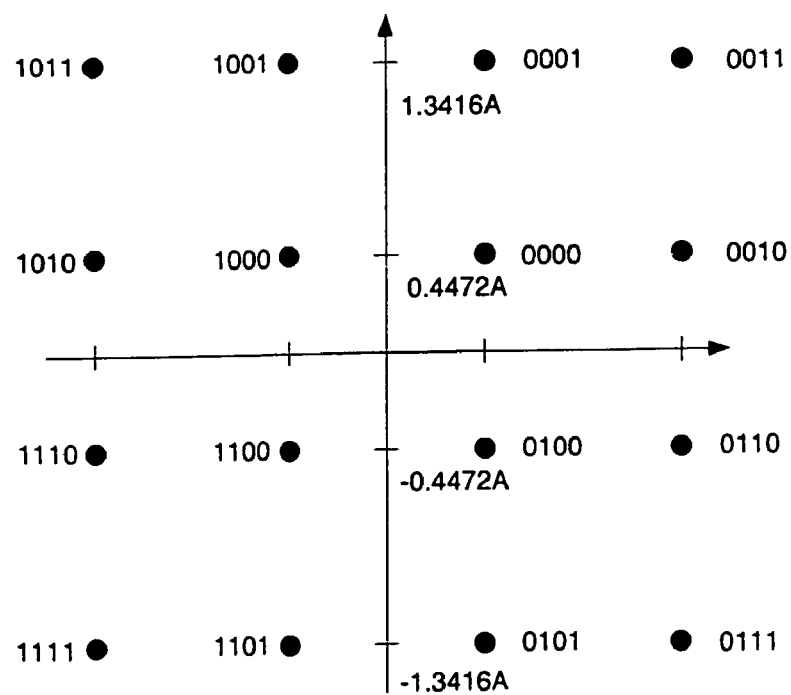

$I_2 = \bar{b}_0 \oplus b_2 = \overline{b_0 \oplus b_2}$ $Q_2 = \bar{b}_1 \oplus b_3 = \overline{b_1 \oplus b_3}$

16 QAM MODULATOR AND METHOD OF 16 QAM MODULATION

BACKGROUND OF THE INVENTION

1. Field of the Invention

The present invention relates to communication, and more particularly, a method and apparatus for modulating data.

2. Description of Related Art

Digital communication relies on numerous different, albeit related, forms of digital modulation such as phase shift keying (PSK), bi-phase shift keying (BPSK), quadrature phase shift keying (QPSK or 4-PSK), and quadrature amplitude modulation (QAM).

BPSK will be described with reference to FIG. 1. As shown, the magnitude of a reference carrier is constant, and to transmit either a 0 or a 1, the phase thereof is "keyed" or switched between 0° and 180°. A receiver then decides whether a 0 or a 1 was transmitted based on the phase of the received carrier, and generates the original data stream. With this simple scheme, one bit of information is transmitted with each state or symbol, so that the carrier phase is keyed at the data rate. FIG. 1 also illustrates the constellation for BPSK. As shown, the BPSK constellation diagram includes two points in the I-Q plane where I stands for in-phase (i.e., phase reference) and Q stands for quadrature (i.e., 90° out-of-phase). The two points in the BPSK constellation diagram represent the position of the signal at the "timing instance". The timing instance is when the receiver interprets the signal. The signal can only be at one position at a time, but the constellation can be thought of as having persistence so that all of the proper states appear. Constellation diagrams such as in FIG. 1 typically do not show the transition between states and it should be noted that this transition does take a finite time. But for clarity, the transitions are not shown otherwise traces connecting the two states would clutter the diagram.

FIG. 2 illustrates the constellation diagram for QPSK. As shown, four different states exist in the QPSK diagram at phase values of 45°, 135°, 225°, and 315°. As further shown, each state corresponds to a symbol representing two bits. Because the data is taken two bits at a time to form a symbol, the symbol rate is half the bit rate. As a result, QPSK requires half the band width of BPSK for the same bit rate.

FIG. 3 illustrates that constellation for 16-QAM (quadrature amplitude modulation). In addition to modulating the phase, the amplitude of the signal is also modulated to create four distinct constellation points within each quadrant of the I-Q plane. As shown, in 16-QAM, one symbol represent four bits of data.

SUMMARY OF THE INVENTION

The development of a modulator generally involves the preparation of an application specific integrated circuit (ASIC). This development may be costly and time consuming. The present invention may mitigate these drawbacks by providing a higher order modulator that may leverage existing lower order modulator circuitry. For example, application specific integrated circuits (ASICs) providing a number (e.g., eight) QPSK modulators on each chip are available and in use in the telecommunication industry. According to aspects of the present invention, this existing technology may be used to generate a 16-QAM signal without the need for costly development of ASICs having 16-QAM modulators. It will be appreciated that the present invention is not limited to this specific example; and that other higher order modulators may be derived from a number (e.g., 2 or more) of lower order modulators.

In one embodiment of the present invention, a digital signal processor (DSP) is used to perform logic operations on four bits of data received for modulation. The logic operations generate the two inputs for a second of two QPSK modulators on an ASIC. The first two bits of the received data are supplied as inputs to the first of the two QPSK modulators. The two QPSK signals are combined to form the 16-QAM signal.

Here, the first QPSK signal generated from the first two bits provides a course indication of the 16-QAM signal. Namely, a QPSK signal is generated that has a constellation point in the same quadrant as the desired 16-QAM signal. The second QPSK signal provides a fine adjustment of the first QPSK signal. Namely, when combined with the first QPSK signal, the second QPSK signal displaces the constellation point of the first QPSK signal into one of the four 16 QAM constellation points within the quadrant.

The DSP exclusive-NORs the first and third bits of the received data to generate a first input of the second QPSK modulator, and exclusive-NORs the second and fourth bits of the received data to generate the second input of the second QPSK modulator. Conceptually, the third and fourth bits in combination with the first and second bits indicate the direction of the displacement.

BRIEF DESCRIPTION OF THE DRAWINGS

The present invention will become more fully understood from the detailed description given herein below and the accompanying drawings, wherein like elements are represented by like reference numerals, which are given by way of illustration only and thus are not limiting of the present invention and wherein:

FIG. 2 illustrates the constellation diagram for quadrature phase shift keying;

FIG. 3 illustrates the constellation diagram for 16-quadrature amplitude modulation;

DETAILED DESCRIPTION OF THE EMBODIMENTS

The present invention is directed to providing a high order modulator using a number of lower order modulators. For the purposes of example only, the derivation of a 16-quadrature amplitude modulator using two QPSK modulators will be described. However, it will be appreciated that the present invention is not limited to this example.

Figure 1:
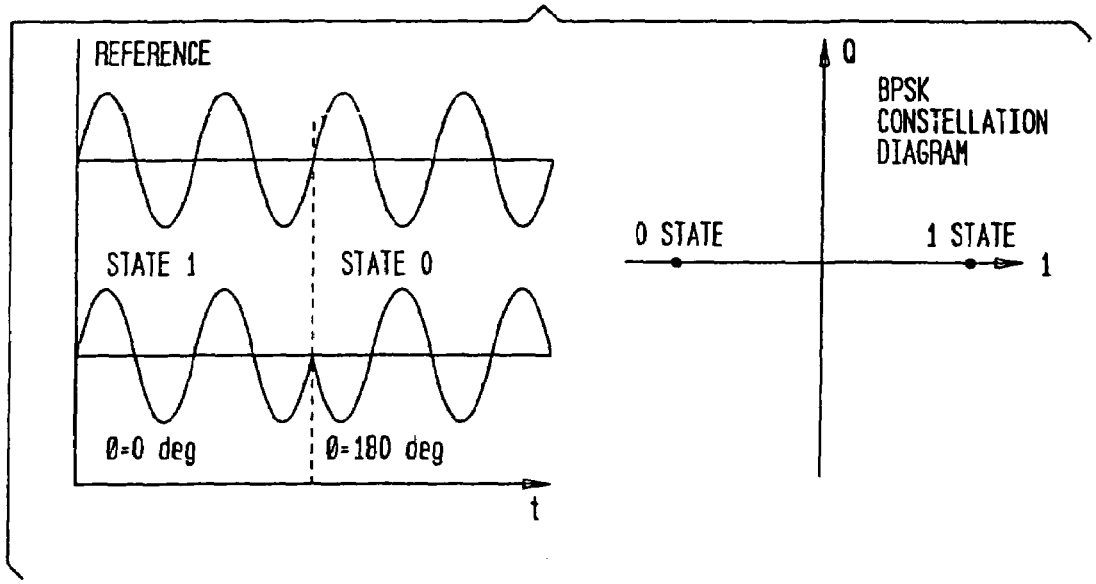
FIG. 1 illustrates the reference carrier, keyed reference carrier and constellation diagram for bi-phase shift keying.
Figure 4:
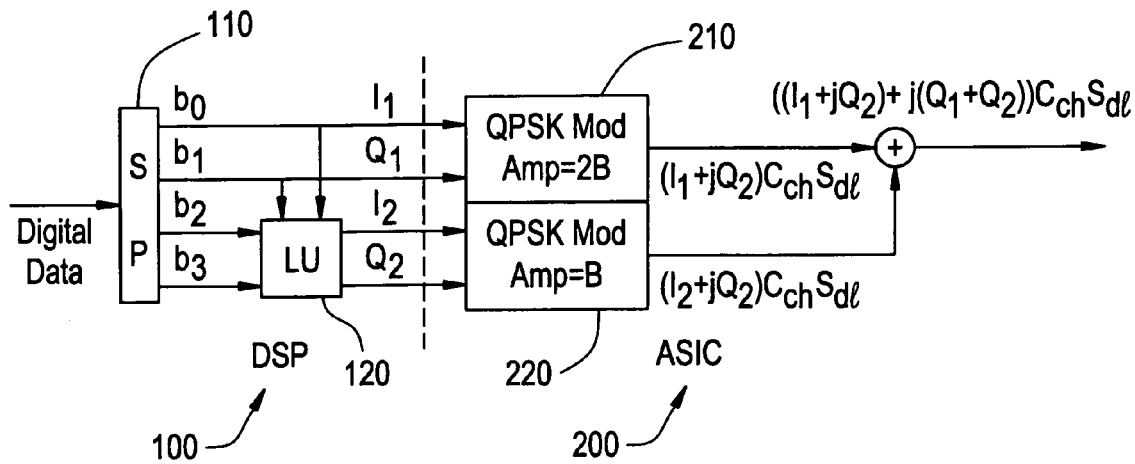
FIG. 4 illustrates an embodiment of the 16-quadrature amplitude modulator according to the present invention.

FIG. 4 illustrates an embodiment of the 16-quadrature amplitude modulator according to the present invention. As shown, sequential digital data is received by a serial-to-parallel converter 110 in a digital signal processor 100 and grouped into four data bits b0, b1, b2 and b3. The four bits of parallel data are supplied to a logic unit 120. The logic unit 120 performs an exclusive-NOR operation on the first and third bits b0 and b2 to generate a first logic output I2, and performs an exclusive-NOR operation on the second and fourth bits b1 and b3 to generate a second logic output Q2. Table 1 below is a logic table illustrating the first and second logic outputs I2 and Q2 for the possible combinations of the first-fourth bits b0, b1, b2 and b3.

TABLE 1

| b0b1b2b | I2 | Q2 |
|---|---|---|
| 0000 | 1 | 1 |
| 0001 | 1 | 0 |
| 0010 | 0 | 1 |
| 0011 | 0 | 0 |
| 0100 | 1 | 0 |
| 0101 | 1 | 1 |
| 0110 | 0 | 0 |
| 0111 | 0 | 1 |
| 1000 | 0 | 1 |
| 1001 | 0 | 0 |
| 1010 | 1 | 1 |
| 1011 | 1 | 0 |
| 1100 | 0 | 0 |
| 1101 | 0 | 1 |
| 1110 | 1 | 0 |
| 1111 | 1 | 1 |

The first and second bits b0 and b1 and the first and second logic outputs are supplied to an application specific integrated circuit (ASIC) 200 that includes a number (e.g., eight) of QPSK modulators. More specifically, the first and second bits b0 and b1 are supplied as the I1 and Q1 inputs, respectively, of a first QPSK modulator 210. Here the I input refers to the In-phase input of the first QPSK modulator 210 and the Q input refers to the quadrature phase input of the first QPSK modulator 210. The first QPSK modulator 210 generates a first QPSK signal in the known manner based on the received inputs. Additionally, in this example embodiment, the QPSK modulator 210 also applies channelization $C_{ch}$ and scrambling $S_{dl}$ codes to the generated QPSK signal in the known manner to generate the first QPSK signal $(I_1+jQ_1)C_{ch}S_{dl}$.

A second QPSK modulator 220 in the ASIC 200 receives the first and second logic outputs as the I and Q inputs, respectively. The second QPSK modulator 220 generates a second QPSK signal based on these inputs in the known manner. As shown in FIG. 4, the first and second QPSK modulators 210 and 220 are configured such that when the same inputs are received, the first QPSK modulator 210 generates a QPSK signal having twice the amplitude of the QPSK signal generated by the second QPSK modulator 220. As with the first QPSK modulator 210, in this embodiment, the second QPSK modulator 220 applies the same channelization $C_{ch}$ and scrambling $S_{dl}$ codes to the generated QPSK signal to generate the second QPSK signal $(I_2+jQ_2)C_{ch}S_{dl}$.

An adder 300, internal or external to the ASIC 200, receives the first and second QPSK signals, and combines these signals to obtain the 16-QAM signal.

Figure 5:
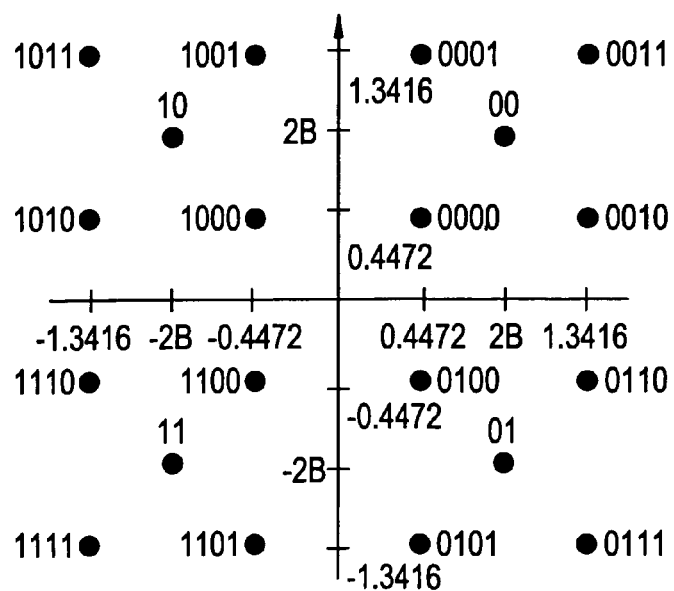
FIG. 5 illustrates the QPSK constellation superimposed on the 16-QAM constellation.

FIG. 5 illustrates the QPSK constellation superimposed on the 16-QAM constellation. As shown the QPSK constellation point in each quadrant lies central to the 16-QAM constellation points in that quadrant. In generating the 16-QAM signal, the first QPSK modulator 210, operating on the first and second bits b0 and b1, generates a first QPSK signal that forms a course approximation of the 16-QAM signal. Namely, the output of the first QPSK modulator 210 provides the QPSK constellation point that is central to the four possible 16-QAM constellation points; and therefore, indicates the quadrant of the 16-QAM signal or constellations points for the 16-QAM signal.

The third and fourth bits b3 and b4 indicate a displacement from the QPSK constellation point given by the first and second bits b0 and b1 to one of the four possible 16-QAM constellation points in the quadrant, but do not include enough information to provide the direction of that displacement. As shown in FIGS. 3 and 5, the quadrants of the 16-QAM constellation are symmetrical about the I and Q axes with respect to third and fourth bits b3 and b4. Accordingly, the logical operation performed by the logic unit 120 in the DSP 100 adds the direction information to the third and fourth bits b3 and b4 in generating the I and Q inputs for the second QPSK modulator 220. In this manner, the second QPSK modulator 220 generates a second QPSK signal providing a fine adjustment to the first QPSK signal. Namely, the second QPSK signal indicates the displacement of the QPSK constellation point from the first QPSK signal to one of the four 16-QAM constellation points.

Table 2 below is a logic table providing the resulting I and Q values of the 16-QAM constellation points shown in FIG. 5 for each of the possible values of the first-fourth bits b0, b1, b2, and b3 when the amplitude B=0.4472.

TABLE 2

| $i_1q_1i_2q_2$ | I branch | Q branch |
|---|---|---|
| 0000 | 0.4472 | 0.4472 |
| 0001 | 0.4472 | 1.3416 |
| 0010 | 1.3416 | 0.4472 |
| 0011 | 1.3416 | 1.3416 |
| 0100 | 0.4472 | −0.4472 |
| 0101 | 0.4472 | −1.3416 |
| 0110 | 1.3416 | −0.4472 |
| 0111 | 1.3416 | −1.3416 |
| 1000 | −0.4472 | 0.4472 |
| 1001 | −0.4472 | 1.3416 |
| 1010 | −1.3416 | 0.4472 |
| 1011 | −1.3416 | 1.3416 |
| 1100 | −0.4472 | −0.4472 |
| 1101 | −0.4472 | −1.3416 |
| 1110 | −1.3416 | −0.4472 |
| 1111 | −1.3416 | −1.3416 |

The present invention provides a 16-QAM modulator that may leverage existing QPSK circuitry. For example, application specific intergrated circuits (ASICs) providing a number (e.g., eight) QPSK modulators on each chip are available and in use in the telecommunication industry. According to aspects of the present invention, this existing technology may be used to generate a 16-QAM signal without the need for costly development of ASICs having 16-QAM modulators.

The invention being thus described, it will be obvious that the same may be varied in many ways. For example, instead of using a DSP, the serial-to-parallel converter and or logic unit may be embodied as hardwired circuits, firmware, etc. Additionally, instead of being embodied on the same ASIC, the QPSK modulator may be disposed on separate ASICs or implemented in a DSP, etc.

Furthermore, while the example of developing a high order 16-QAM modulator using two lower order QPSK modulators was provided, it will be readily apparent from the forgoing disclosure that other higher order modulators may be developed using a number (e.g., 2 or more) QPSK or other lower order modulators. Such variations are not to be regarded as a departure from the invention, and all such modifications are intended to be included within the scope of the invention.

I claim:

1. A 16-quadrature amplitude modulation QAM modulator, comprising:
   a logic operation device performing a logic operation on first-fourth bits of received data to generate first and second logic outputs;
   a first quadrature phase shift keying QPSK modulator receiving the first and second bits of received data and generating a first QPSK signal;

a second QPSK modulator receiving the first and second logic outputs and generating a second QPSK signal; and a combiner combining the first and second QPSK signals to generate a 16-QAM signal.

2. The modulator of claim 1, wherein the logic operation device performs an exclusive-NOR operation on the first and third bits of received data to generate the first logic output and performs an exclusive-NOR operation on the second and fourth bits of the received data to generate the second logic output.

3. The modulator of claim 2, wherein the first QPSK modulator and the second QPSK modulator are configured such that for a same input the first QPSK modulator generates the first QPSK signal having twice an amplitude of the second QPSK signal.

4. The modulator of claim 1, wherein the logic operation device is a digital signal processor.

5. The modulator of claim 4, wherein the first and second QPSK modulators are provided on an application specific integrated circuit ASIC.

6. The modulator of claim 1, wherein the logic operation device is a logic circuit.

7. The modulator of claim 1, wherein the first QPSK modulator and the second QPSK modulator are configured such that for a same input the first QPSK modulator generates the first QPSK signal having twice an amplitude of the second QPSK signal.

8. The modulator of claim 1, wherein the first and second QPSK modulators apply same channelization and scrambling codes in generating the first and second QPSK signals.

9. A 16-quadrature amplitude modulation QAM modulator, comprising:

a first quadrature phase shift keying QPSK modulator receiving first and second bits of data, and generating a first QPSK signal providing a course indication of a 16-QAM signal based on the first and second bits of data;

a second QPSK modulator receiving first and second inputs, and generating a second QPSK signal indicating a fine adjustment to the course indication of the 16-QAM signal based on the first and second inputs;

a logical operation device generating the first and second inputs from the first-fourth bits of received data; and a combiner combining the first and second QPSK signals to generate the 16-QAM signal.

10. The modulator of claim 9, wherein
the first QPSK signal indicates at least a quadrant in the in-phase and quadrature-phase constellation plane for the 16-QAM signal; and
the second QPSK signal indicates a displacement of the first QPSK signal within the quadrant.

11. The modulator of claim 10, wherein the first and second QPSK modulators are provided on an application specific integrated circuit ASIC.

12. The modulator of claim 11, wherein the logic operation device is a digital signal processor.

13. The modulator of claim 9, wherein the first QPSK modulator and the second QPSK modulator are configured such that for a same input the first QPSK modulator generates the first QPSK signal having twice an amplitude of the second QPSK signal.

14. The modulator of claim 9, wherein the logic operation device performs an exclusive-NOR operation on the first and third bits of received data to generate the first logic output and performs an exclusive-NOR operation on the second and fourth bits of the received data to generate the second logic output.

15. A method of 16-quadrature amplitude modulation QAM, comprising:

performing a logic operation on first-fourth bits of received data to generate first and second logic outputs;

generating a first quadrature phase shift keying QPSK signal based on the first and second bits of received data;

generating a second QPSK signal based on the first and second logic outputs; and combining the first and second QPSK signals to generate a 16-QAM signal.

16. The method of claim 15, wherein the performing step comprises:

performing an exclusive-NOR operation on the first and third bits of received data to generate the first logic output; and performing an exclusive-NOR operation on the second and fourth bits of the received data to generate the second logic output.

17. The method of claim 16, wherein the generating a first QPSK signal step generates the first QPSK signal having twice an amplitude of the second QPSK signal.

18. The method of claim 15, wherein the generating a first QPSK signal step generates the first QPSK signal having twice an amplitude of the second QPSK signal.

19. The method of claim 15, wherein the generating a first QPSK signal step and the generating a second QPSK signal step apply same channelization and scrambling codes in generating the first and second QPSK signals.

20. A method of 16-quadrature amplitude modulation QAM, comprising:

generating a first QPSK signal providing a course indication of a 16-QAM signal based on first and second bits of received data;

generating a second QPSK signal indicating a fine adjustment to the course indication of the 16-QAM signal based on first and second inputs;

generating the first and second inputs from the first-fourth bits of received data; and combining the first and second QPSK signals to generate the 16-QAM signal.

21. The method of claim 20, wherein
the first QPSK signal indicates at least a quadrant in the in-phase and quadrature-phase constellation plane for the 16-QAM signal; and
the second QPSK signal indicates a displacement of the first QPSK signal within the quadrant.

22. The method of claim 20, wherein the generating a first QPSK signal step generates the first QPSK signal having twice an amplitude of the second QPSK signal.

23. The method of claim 20, wherein the generating the first and second logic inputs step comprises:

performing an exclusive-NOR operation on the first and third bits of received data to generate the first logic input; and performing an exclusive-NOR operation on the second and fourth bits of the received data to generate the second logic input.

* * * * *